Figure 1:
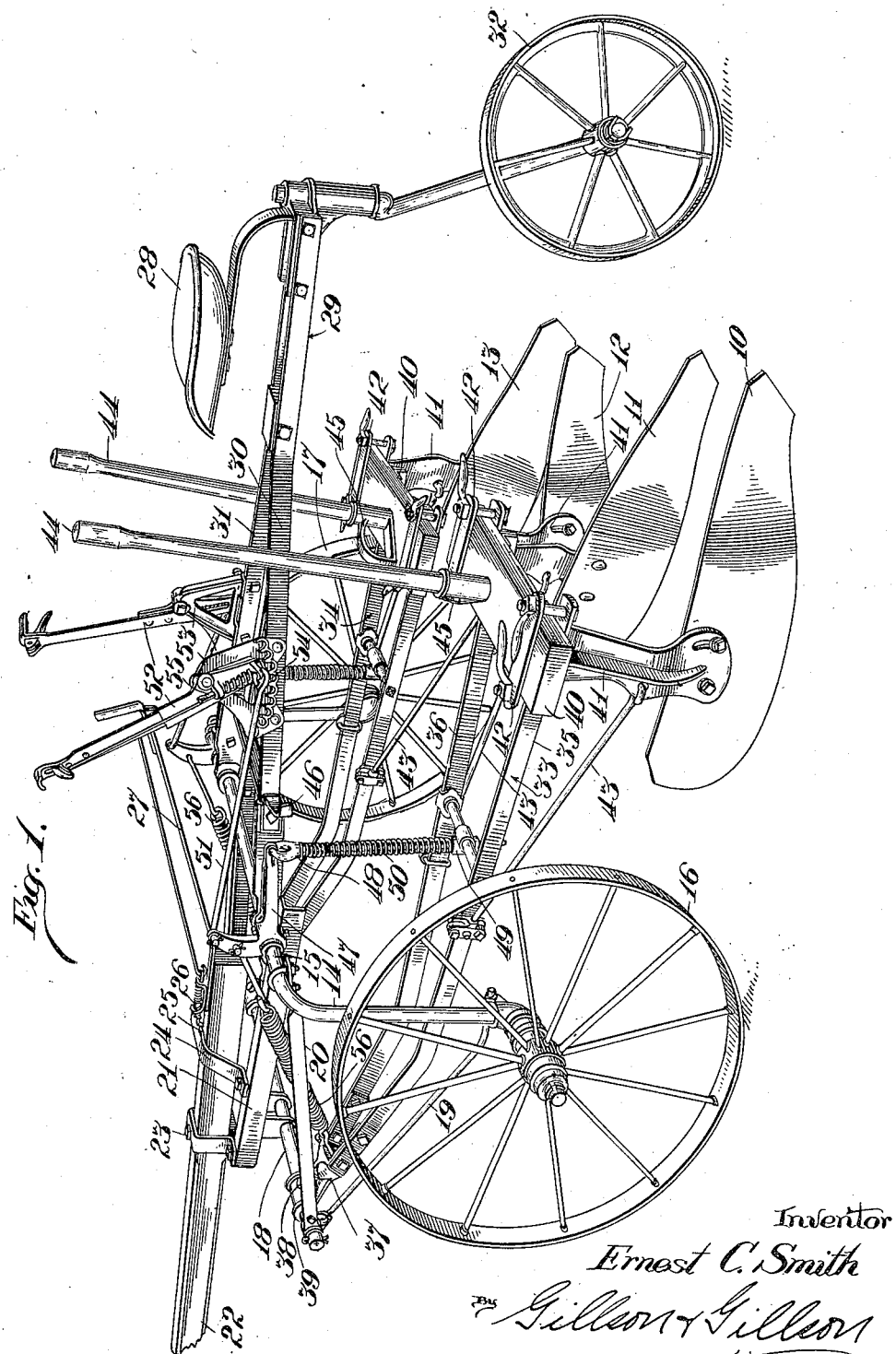

E. C. SMITH.
CULTIVATOR.
APPLICATION FILED SEPT. 10, 1918.

1,310,583.

Patented July 22, 1919.
3 SHEETS—SHEET 1.

Inventor
Ernest C. Smith
By Gillson & Gillson
Attorneys.

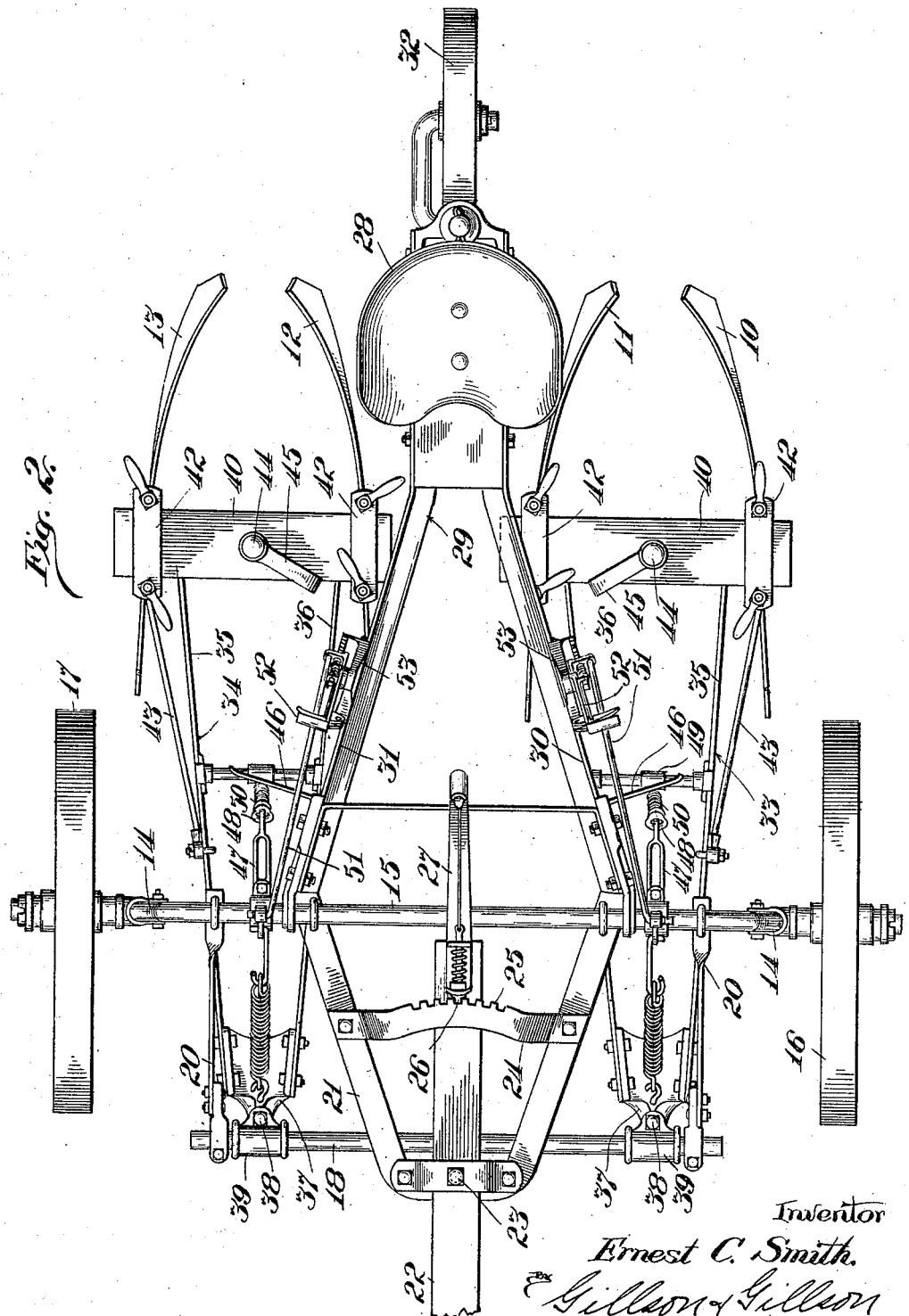

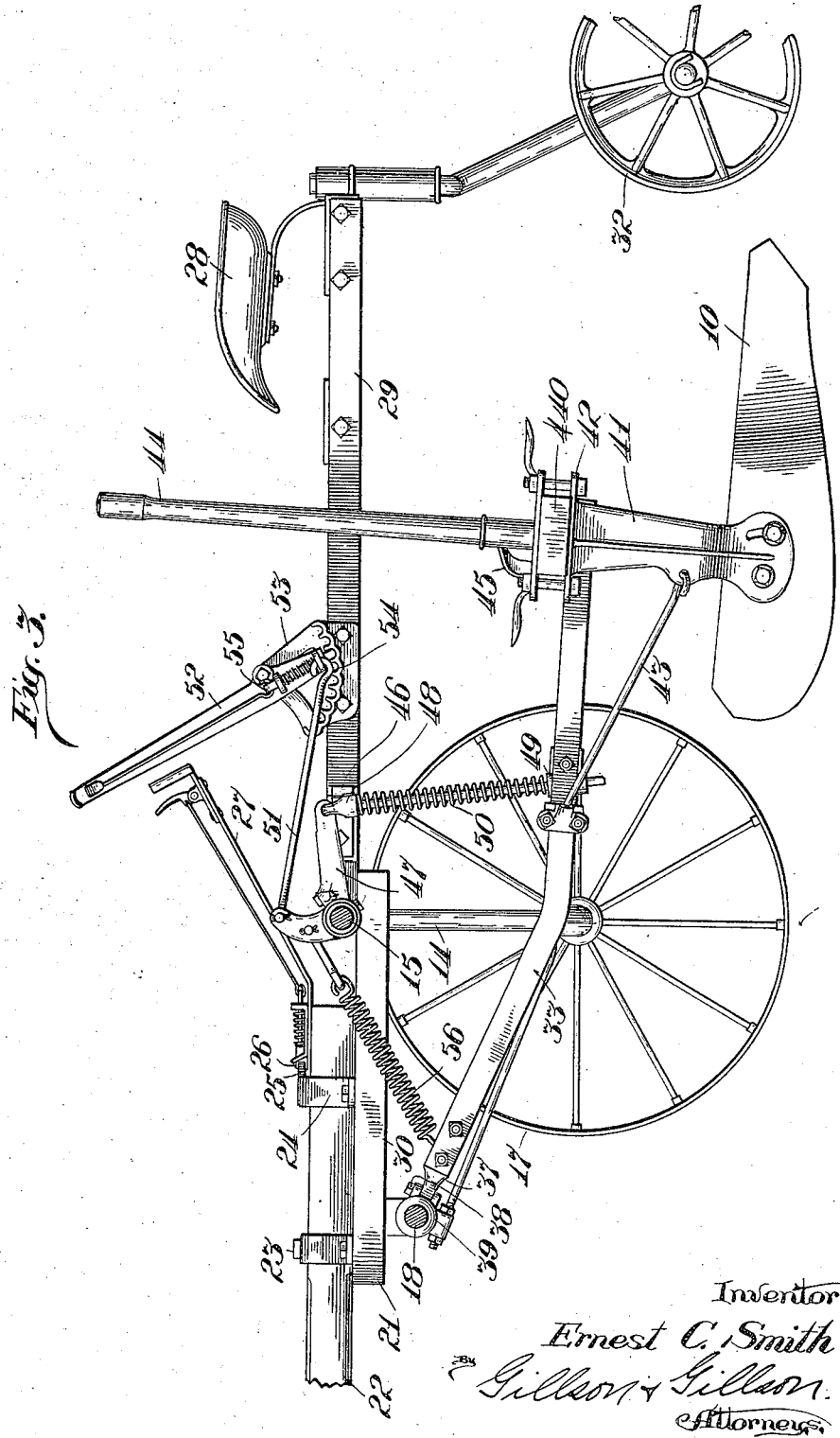

UNITED STATES PATENT OFFICE.

ERNEST C. SMITH, OF HOOSICK FALLS, NEW YORK, ASSIGNOR TO WALTER A. WOOD MOWING & REAPING MACHINE CO., OF HOOSICK FALLS, NEW YORK, A CORPORATION OF NEW YORK.

CULTIVATOR.

1,310,583.  Specification of Letters Patent.  Patented July 22, 1919.

Application filed September 10, 1918. Serial No. 253,374.

*To all whom it may concern:*

Be it known that I, ERNEST C. SMITH, a citizen of the United States, and resident of Hoosick Falls, county of Rensselaer, State of New York, (my post-office address being 1 Richmond street, in said city,) have invented certain new and useful Improvements in Cultivators, of which the following is a specification, and which are illustrated in the accompanying drawings, forming a part thereof.

The invention relates to cultivators and has special reference to implements for gathering the loosened earth into hills which extend along the rows of potato plants and the like. The object of the invention is to provide an improved machine of the type indicated, some of the improvements having to do with the provision of a pivotally connected seat-carrying frame and with the manner of mounting and controlling the shovel-carrying frames.

In the accompanying drawings:—

Figure 1 is a perspective view illustrating a machine embodying the features of improvement provided by the invention, and Figs. 2 and 3 are a plan view and a side elevation respectively of the same.

The drawings illustrate a machine having two sets of shovels as 10, 11, and 12, 13, and adapted to operate simultaneously along two rows of plants. When equipped with shovels of the form shown the machine will preferably be used after the soil between the rows has been loosened by cultivation and for the purpose of gathering the loosened earth into hills.

The main frame of the machine comprises an arching axle generally designated 14, the intermediate horizontal portion 15 of the axle extending substantially the full distance between the carrying wheels 16, 17, and being above the level of the tops of these wheels. Another transverse frame member 18 extends in front of the axle 14 and is rigidly connected thereto at its opposite ends, as by braces 19 and 20. The frame member 18 and axle 14 are also connected intermediate their ends by a horizontal yoke 21. This yoke serves for the attachment of the tongue 22 which is pivotally connected to the yoke at its forward end, as by a bolt 23. A strap 24 having its intermediate portion formed to provide a notched quadrant 25 extends between the sides of the yoke 21 over the tongue 22 in rear of the pivot bolt 23. The quadrant 25 coöperates with a locking pin 26 for holding the tongue 22 in angularly adjusted position, the adjustment being effected through a hand lever 27 which is rigidly connected to the tongue and extends upwardly and rearwardly therefrom toward the driver's seat, as 28.

The seat 28 is mounted at the rear end of a seat-carrying frame, generally designated 29. At its forward end the seat-carrying frame 29 is forked and its two arms 30 and 31 are each pivotally connected with the horizontal intermediate portion 15 of the axle. The rear end of the seat-carrying frame 29 is carried by a caster wheel 32, the pivotal connection of the frame with the axle 14 permitting the frame to rise and fall during the travel of the caster wheel 32 over the uneven ground.

The shovels, as 10, 11 and 12, 13 of each set are mounted in a shovel-carrying frame generally designated 33 or 34. Each shovel-carrying frame 33, 34, comprises a pair of side frame members 35, 36, and has a universal connection at its forward end with the transverse frame member 18. For this purpose the side frame members 35, 36 have their forward ends united with a bracket 37 and a pivot bolt 38 connects this bracket with a collar 39 which turns upon the transverse frame member 18. As it is desirable that these shovels, as 10, 11, 12, 13 should be adjustably mounted in the corresponding frames each shovel carrying frame 33, 34 preferably also includes a stout plank 40 which connects the side frame members 35, 36 at their rear ends. When this construction is employed, each of the shovels 10, 11, 12, 13, is applied to a separate bracket 41 and clamps, as 42, are employed for uniting the brackets 41 with the corresponding planks 40. As the brackets 41 are preferably of considerable height with the shovels 10, 11, 12, 13, applied to their lower ends, a brace rod 43 extends forwardly from each bracket 41 to the adjacent side member 35 or 36 of the corresponding shovel-carrying frame. The planks 40 preferably also carry pillars 44 which extend upwardly to positions adjacent the driver's seat 28, as also foot stirrups 45. The shovels 10, 11, and 12, 13, of each set are accordingly guided along the rows of plants both by the use of the stirrups 45 and the handles 44. The shovel carrying frames 33, 34, swing upon the pivot bolts 38, for this purpose. When the shovels 10, 11, 12, 13, are to be lifted from the ground, the operator's feet are disengaged from the stirrups 45 and engaged with the foot rests, as 46, one of which is applied to each of arms 30, 31, of the seat-carrying frame 29.

The means for elevating the shovel-carrying frames 33, 34, preferably includes a pair of bell crank levers 47 one of which is journaled upon the transverse portion 15 of the axle 14 adjacent each of the arms 31 of the seat-carrying frame. An eye bolt 48 is connected with one of the arms of each of the bell crank levers 47 and depends therefrom to the corresponding shovel-carrying frame 33, 34 where it extends through and has limited sliding engagement with an apertured bracket 49 which is swiveled between the arms 35, 36 of the shovel-carrying frame. A spring 50 coiled about the eye bolt 48 normally reacts upon the bracket 49 to depress the corresponding shovel-carrying frame 33, 34, and force the shovels 10, 11, or 12, 13, into the ground.

The other arm of each bell crank lever 47 is connected through a link 51 with the lower end of a hand lever 52. The hand levers 52 are accordingly to be used for lifting the shovels 10, 11 and 12, 13 from the ground. For this purpose it is desirable that they should be within convenient reach from the driver's seat 28. As shown, each hand lever 52 is pivotally mounted upon a bracket 53 which is firmly mounted upon the corresponding arm 31, 31 of the seat-carrying frame 29. As it is desirable that each shovel-carrying frame 33, 34, may be held in various adjusted positions, the brackets 53 are preferably formed with notched quadrants 54 and locking pins 55 are carried by the hand levers 52 and play over these quadrants. The lifting of the shovel-carrying frame 33, 34 will be somewhat facilitated if a stout spring 56 is extended between one of the arms of each bell crank lever 47 and a part of the shovel-carrying frame 33, 34, adjacent the forward end of the same.

I claim as my invention:

1. In a cultivator, in combination, an arching axle having a relatively long intermediate elevated portion, main carrying wheels mounted upon the opposite ends of the axle, a seat carrying frame pivotally connected with the said intermediate portion of the axle and extending rearwardly therefrom, a caster wheel supporting the seat carrying frame at its rear end, a transverse frame member in front of the axle and rigidly connected thereto, a shovel carrying frame having a universal joint connection with the said transverse frame member adjacent each end of the same and extending rearwardly therefrom under the axle, elevating means mounted upon the said intermediate portion of the axle at each side of the seat carrying frame and extending to the corresponding shovel carrying frame and operating means for each of the said elevating means mounted on the seat carrying frame.

2. In a cultivator, in combination, an arching main frame, main carrying wheels at opposite sides of the frame, a seat carrying frame pivotally connected to the main frame to swing in a vertical plane and extending rearwardly from the main frame, a caster wheel supporting the seat carrying frame at its rear end, a shovel carrying frame pivotally connected to the main frame at its forward end and extending rearwardly under the main and seat carrying frames, a bell crank pivotally mounted upon said main frame, a link connecting one arm of said bell crank and said shovel carrying frame, a spring connected to the other arm of the bell crank and to the shovel carrying frame adjacent its pivot, an operating lever pivotally mounted on the seat carrying frame, and a link connecting the said operating lever and the last mentioned arm of the bell crank.

3. In a cultivator, a main frame, a shovel carrying frame comprising rearwardly diverging longitudinal frame members having a common pivotal connection at their forward ends with the cultivator frame, a transverse frame member rigidly connected to the separated rear ends of said longitudinal members of the shovel carrying frame, shovel brackets laterally adjustable on said transverse member and a brace pivotally connected to each shovel bracket and extending to one of the longitudinal members of the shovel carrying frame.

4. In a cultivator, in combination, an arching main frame, carrying wheels at opposite sides of the frame, a seat carrying frame connected to and extending rearwardly from the main frame, a shovel carrying frame pivotally connected to the main frame at its forward end and extending rearwardly under the main and seat carrying frames, a bell crank pivotally mounted on said main frame, a link connecting one arm of said bell crank and said shovel carrying frame, a lifting spring one end of which is connected to the other arm of the bell crank and the other end of which is anchored adjacent the pivot of the shovel carrying frame, an operating lever pivotally mounted on the seat carrying frame, and a link connecting the said operating lever and the last mentioned arm of the bell crank.

5. In a cultivator, in combination, an arching main frame, carrying wheels at opposite sides of the frame, a shovel carrying frame pivotally connected to the main frame at its forward end to swing in a vertical plane and extending rearwardly from its point of pivotal connection with the main frame under the main frame, a bell crank pivotally mounted on the main frame over the shovel carrying frame at a substantial distance from its forward end, one arm of the bell crank extending rearwardly from its pivot and the other arm of the bell crank being approximately upright, a link connecting the first mentioned arm of the bell crank and the shovel carrying frame, a lifting spring connected to and extending downwardly and forwardly from the upright arm of the bell crank to a point of connection with the shovel carrying frame adjacent to but in rear of its pivotal connection with the main frame and manually operable means for swinging the bell crank.

ERNEST C. SMITH.

Copies of this patent may be obtained for five cents each, by addressing the "Commissioner of Patents, Washington, D. C."